(12) United States Patent
Aizawa

(10) Patent No.: US 7,755,661 B2
(45) Date of Patent: Jul. 13, 2010

(54) IMAGE DATA TRANSFER CONTROL IN DIGITAL IMAGING SYSTEM

(75) Inventor: Takashi Aizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1249 days.

(21) Appl. No.: 10/808,868

(22) Filed: Mar. 25, 2004

(65) Prior Publication Data
US 2004/0189810 A1    Sep. 30, 2004

(30) Foreign Application Priority Data
Mar. 25, 2003    (JP) .............................. 2003-083428

(51) Int. Cl.
*H04N 5/225* (2006.01)

(52) U.S. Cl. .................. 348/207.1; 348/231.2

(58) Field of Classification Search .............. 348/207.1, 348/207.11, 231.2, 231.6, 231.99, 232, 552, 348/207.99, 376, 207.2, 231.9, 211.1; 358/1.6, 358/1.9, 3.23, 231.3
See application file for complete search history.

(56) References Cited

U.S. PATENT DOCUMENTS

| | | | |
|---|---|---|---|
| 6,724,777 B1 * | 4/2004 | Yamazaki et al. | 370/473 |
| 6,785,727 B1 * | 8/2004 | Yamazaki | 709/229 |
| 6,889,364 B2 * | 5/2005 | Camara et al. | 715/771 |
| 6,914,625 B1 * | 7/2005 | Anderson et al. | 348/222.1 |
| 6,930,709 B1 * | 8/2005 | Creamer et al. | 348/211.3 |
| 6,937,356 B1 * | 8/2005 | Ito et al. | 358/1.16 |
| 6,947,075 B1 * | 9/2005 | Niikawa | 348/211.14 |
| 6,954,229 B1 * | 10/2005 | Otala | 348/231.99 |
| 6,954,280 B1 * | 10/2005 | Kaibara | 358/1.15 |
| 7,034,880 B1 * | 4/2006 | Endsley et al. | 348/333.11 |
| 7,095,436 B2 * | 8/2006 | Kato | 348/231.2 |
| 7,151,564 B2 * | 12/2006 | Kubo | 348/231.6 |
| 7,170,551 B2 * | 1/2007 | Fichtner | 348/207.1 |
| 7,304,665 B2 | 12/2007 | Takahashi | |
| 7,304,667 B2 * | 12/2007 | Watanabe et al. | 348/221.1 |
| 7,321,763 B2 * | 1/2008 | Tanaka et al. | 455/414.1 |
| 7,327,387 B2 * | 2/2008 | Tanaka et al. | 348/207.99 |
| 2001/0022624 A1 | 9/2001 | Tanaka | |
| 2001/0047403 A1 * | 11/2001 | Chiba | 709/219 |
| 2002/0054224 A1 * | 5/2002 | Wasula et al. | 348/232 |
| 2002/0090208 A1 * | 7/2002 | Hatanaka | 386/117 |
| 2003/0030733 A1 * | 2/2003 | Seaman et al. | 348/239 |
| 2004/0109062 A1 * | 6/2004 | Yamaya | 348/207.1 |
| 2004/0114044 A1 * | 6/2004 | McCurdy et al. | 348/207.99 |
| 2004/0201742 A1 * | 10/2004 | Malloy Desormeaux | 348/231.6 |

FOREIGN PATENT DOCUMENTS

| | | |
|---|---|---|
| JP | 2001-238118 A | 8/2001 |
| JP | 2002-354149 A | 12/2002 |
| JP | 2002-369106 | 12/2002 |
| WO | WO 02/084999 | 10/2002 |

OTHER PUBLICATIONS

Japanese Office Action dated Sep. 2, 2008.

* cited by examiner

*Primary Examiner*—John M Villecco
*Assistant Examiner*—Kent Wang
(74) *Attorney, Agent, or Firm*—Cowan, Liebowitz & Latman, P.C.

(57) ABSTRACT

When a digital camera 100 is connected to an information processing apparatus 101 so that they can communicate with each other, the digital camera 100 generates partial information of attribute information related to each image data stored in the camera 100, and transmits the partial information of the attribute information to the information processing apparatus 101.

26 Claims, 7 Drawing Sheets

IMAGE DATA TRANSFER CONTROL IN DIGITAL IMAGING SYSTEM

FIELD OF THE INVENTION

The present invention relates to a technology of image data transfer control that is applicable to a digital imaging system in which an image generating apparatus having therein an image storage device, such as a digital camera, and an information processing apparatus such as a personal computer, are interconnected via a communication line.

BACKGROUND OF THE INVENTION

Image and/or audio data taken by a digital camera would conventionally be recorded onto a recording device provided in the camera, such as a flash memory, or onto a recording medium freely removable from the camera. Also, a system has been devised and introduced commercially which connects a digital camera with an information processing apparatus such as a computer (referred to as PC hereinafter) through a cable or the like thereby to transfer to the PC information of image data recorded onto a recording device in the digital camera or onto a recording medium removable from the digital camera.

Upon such data transfer, commonly used protocols are a Picture Transfer Protocol (PTP) which is a standard data transfer protocol tailored to digital cameras, and Mass Storage Class (MSC) which is a so-called removable disk-related protocol. When the MSC is used for connecting the digital camera with the PC, the digital camera is handled simply as an external recording device such as an externally connected hard disk drive (HDD) or a card reader. This allows users to easily access image data in the camera without any particular driver software or technical knowledge.

The use of the MSC, however, causes the PC to control all file accesses, and is therefore unsuitable for a system which permits concurrent operations of manipulating the camera with operation members provided thereon and of accessing the camera from the PC. In the camera, Read and Write commands are merely executed according to a designated address and length of data and it is difficult to manage data in meaningful units such as files.

Furthermore, except for users who have detailed knowledge of the PC, many digital camera users, which have been increasing recently, are not familiar with the PC. Such users may have difficulty in identifying the digital camera due to the MSC because the camera is recognized simply as an external storage device on an operation system, so that those users probably get confused.

On the other hand, when the PTP is used for connecting the digital camera to the PC, it is easy for users to identify the digital camera because, unlike the MSC, the camera is handled not simply as a storage device but as a digital camera on an operating system, and thus operability can be more improved. Also, the PTP is designed for digital cameras, thereby allowing the camera to manage object data by defining data of files as objects.

Moreover, recently developed operating systems, Windows® XP and MacOSX®, come with a PTP compliant driver from the OS vender so that special driver software is not necessary when connected to the digital camera.

Also, when the PTP is used, the camera manages data by the object as is described above, and thus it is possible to, relatively more easily than the MSC, configure a system capable of concurrent operations to both the camera and PC. Additionally, it is convenient for users since they can identify the digital camera.

The PTP, however, possesses the following disadvantage. It is assumed in the PTP that a system is to be configured so that, when the camera is connected to the PC, the camera itself generates attribute information of all object data stored in the camera and PC acquires those attribute information. Therefore, large amount of image data in the camera requires substantial amount of time to be acquired by the PC when the camera is connected thereto, and users thus have to wait long without moving on to the subsequent operations.

SUMMARY OF THE INVENTION

The present invention has been made in consideration of the above situation, and has its object to provide an operational environment comparatively convenient for users even when large amount of image data is stored in an image storage device of, inter alia, a digital camera.

According to the present invention, the foregoing object is attained by providing an information acquisition method for an information processing apparatus which acquires attribute information related to image data of images stored in an external device, comprising:

detecting whether the information processing apparatus is connected to the external device so that they can communicate with each other; and acquiring partial information of the attribute information for each of the images when the information processing apparatus is connected to the external device.

According to the present invention, the foregoing object is also attained by providing an information processing method for an image recording apparatus which generates attribute information related to image data of stored images, comprising:

detecting whether the image recording apparatus is connected to an external device so that they can communicate with each other;

generating partial information of the attribute information for each of the images when the image recording apparatus is connected to the external device; and transmitting the generated partial information of the attribute information to the external device.

According to the present invention, the foregoing object is also attained by providing an information processing apparatus comprising:

a connection unit that is connectable to an external device so to be communicated therewith; and an attribute information acquisition unit that acquires attribute information related to image data of images recorded in the external device, wherein the attribute information acquisition unit acquires from the external device partial information of the attribute information for each of the images when the information processing apparatus is connected to the external device.

According to the present invention, the foregoing object is also attained by providing an image recording apparatus comprising:

an attribute information generation unit that generates attribute information related to image data of recorded images; and a transmission unit that transmits the attribute information generated by the attribute information generation unit to an external device, wherein when the image recording apparatus is connected to the external device so that they can communicate with each other, the attribute information generation unit generates partial information of the attribute information for each of the images, and the transmission unit transmits the generated partial information to the external device.

According to the present invention, the foregoing object is also attained by providing an information processing method for a digital imaging system having a digital image generating apparatus and an information processing apparatus, the digital image generating apparatus storing image data of a plurality of generated images as image files in a storage device, the method comprising:

the image processing apparatus managing a plurality of pieces of attribute information contained in object information related to each of the image files in the digital image generating apparatus in two or more categories; and the image processing apparatus creating for each of the image files, an object only containing information in a part of the categories out of the plurality of pieces of attribute information when the digital image generating apparatus is connected to the information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

A preferred embodiment of the present invention will be described in detail in accordance with the accompanying drawings.

Figure 1:
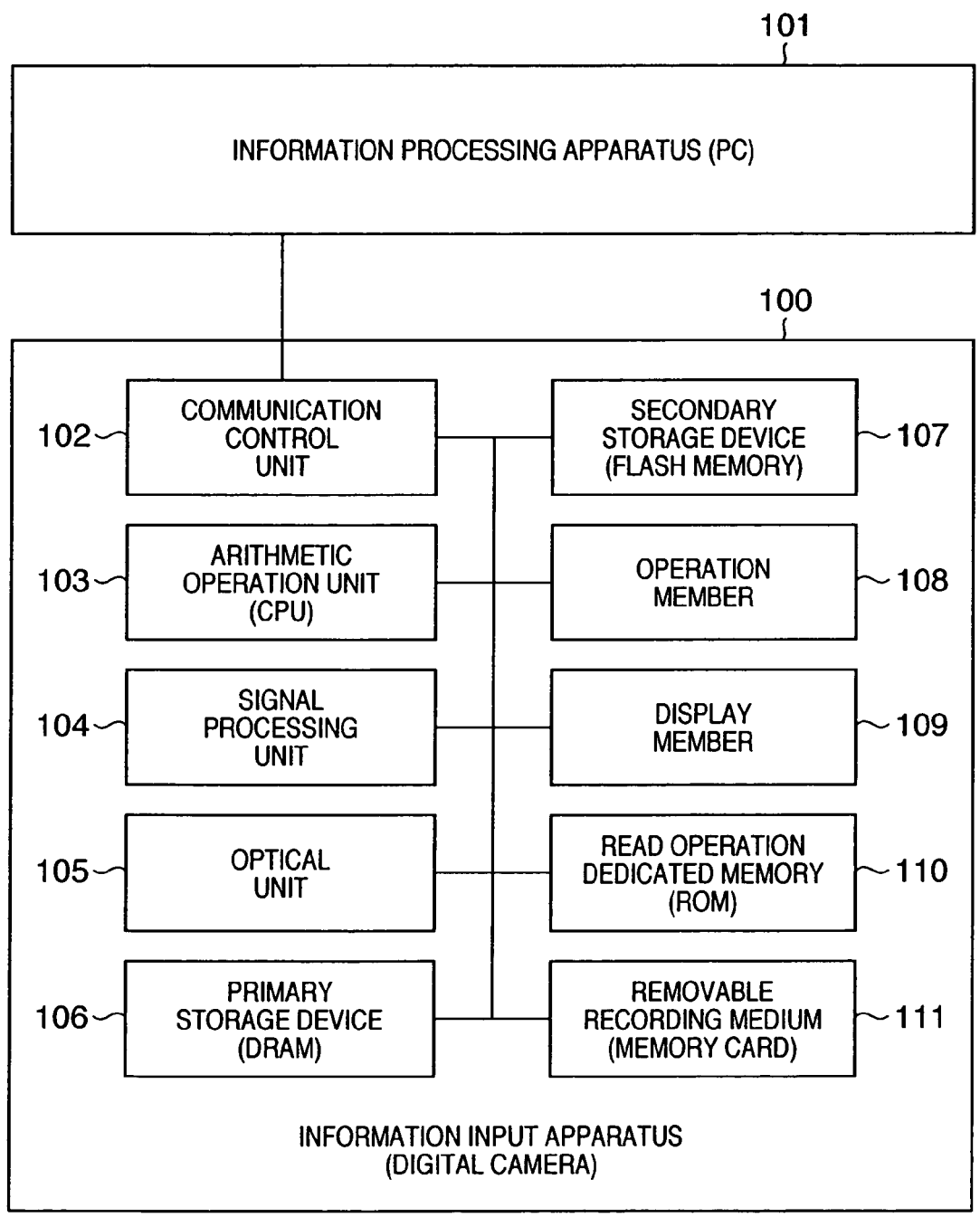
FIG. 1 is a block diagram schematically showing a basic configuration of a digital camera in a digital camera system according to an embodiment of the present invention.

FIG. 1 is a schematic block diagram showing a configuration of a digital camera system according to an embodiment of the present invention. The digital camera system according to this embodiment is divided broadly into an information input apparatus such as a digital camera (referred to as digital camera hereinafter) 100 and an information processing apparatus (referred to as PC hereinafter) 101.

The digital camera 100 comprises an optical unit 105 including a lens, CCD, driving circuit, and the like, a signal processing unit 104 for processing image data and the like, an arithmetic operation unit 103 such as a CPU, a primary storage device 106 such as a DRAM, a secondary storage device 107 such as a built-in flash ROM, an operation member 108, a display member 109 such as a liquid crystal display (LCD), read operation dedicated memory 110 used for program storage, such as a ROM, a removable recording medium 111 such as a compact Flash® memory card, and a communication control unit 102 for managing connection with the PC 101.

The digital camera may have only the removable recording medium 111 or the secondary storage device 107 such as an unremovable built-in flash ROM, depending on a type of the camera.

Figure 2:
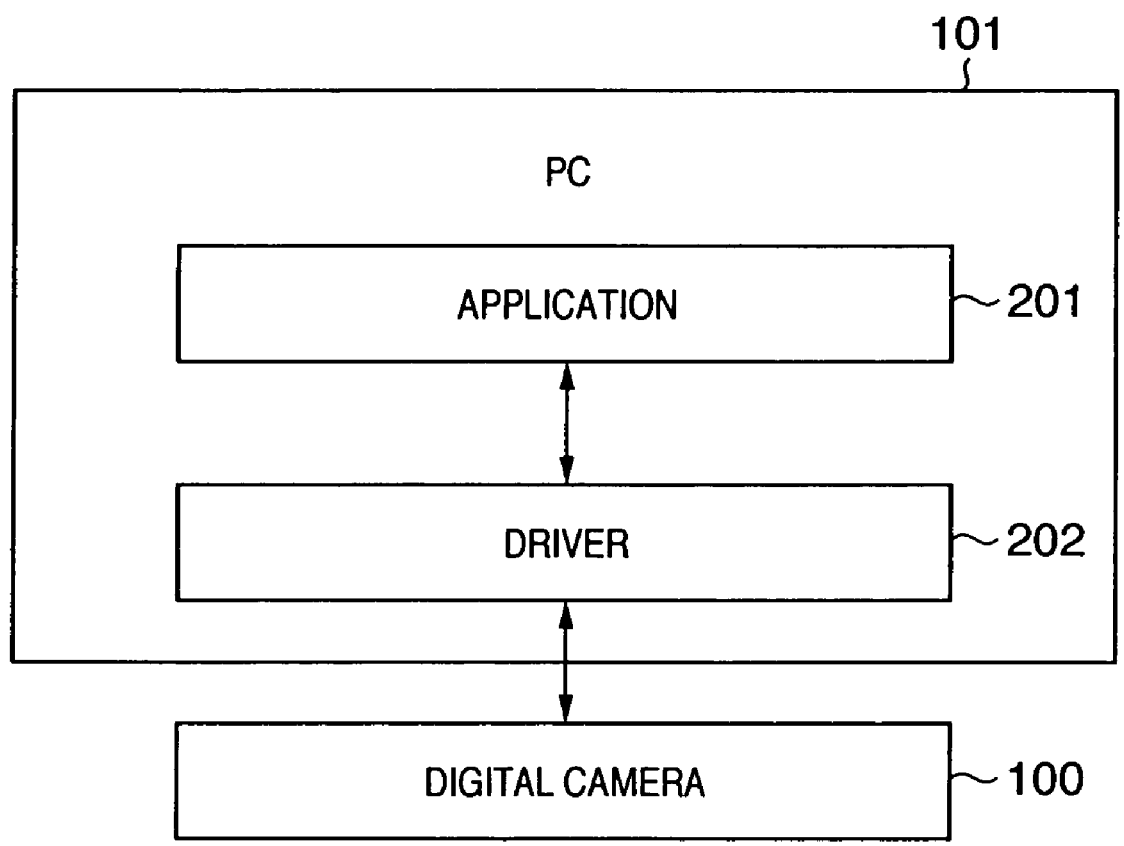
FIG. 2 is a block diagram showing a basic configuration of an information processing apparatus in the digital camera system according to the embodiment of the present invention.

FIG. 2 is a diagram showing a main configuration of the PC 101 in the digital camera system according to the embodiment.

The PC 101 of FIG. 2 generally comprises the following components not shown, which are a central processing unit (CPU), a ChipSet, a primary storage device (DRAM), a BIOS-ROM, a secondary storage device (HDD), a graphics device, a power supply, and the like, and the PC 101 is connected with external devices such as operational devices including a display, keyboard and mouse. The PC 101 is provided with a USB port, which is used to connect with the digital camera 100 in this embodiment. Note that the connecting method is, of course, not limited to the USB, and various known wired or wireless methods can be also employed. Therefore, the camera 100 and the PC 101 may only be so constructed as to communicate with each other by at least one of the above methods.

In the PC 101, driver software 202 and application software 201 for exchanging data with the digital camera 100 are developed on a DRAM and then executed. The driver software 202 mentioned herein includes a basic module operable to exchange data with the digital camera 100, and is loaded and executed by an operating system at the time when the digital camera 100 is connected to the PC 101 through a USB cable.

The application software 201 has, for example, user interfaces to provide operation members to end users so that they can acquire or delete image data and the like in the digital camera 100 or control operations of the digital camera 100.

Figure 3:
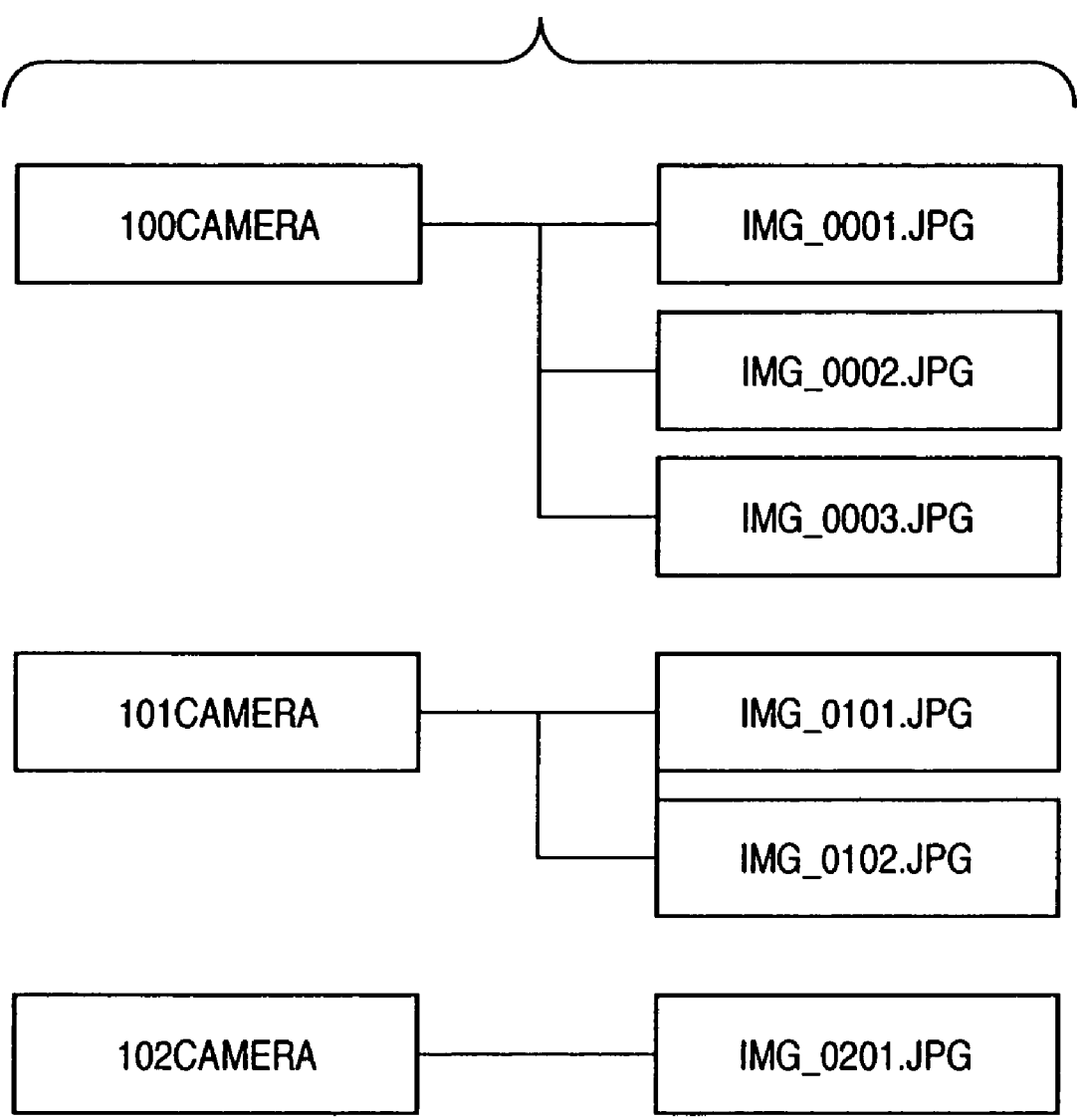
FIG. 3 shows an example of a structure of recorded image data in the digital camera.

The following paragraphs describe how the driver software 202 handles image data in the digital camera 100. It is assumed that image data is recorded in the digital camera 100 as structurally shown in FIG. 3. In this drawing, "100CAMERA", "101CAMERA" and "102CAMERA" each represent a folder, and each image file has an extension "JPG".

The folder "100CAMERA" contains IMG_0001.JPG, IMG_0002.JPG and IMG_0003.JPG, and the folder "101CAMERA" contains IMG_0101.JPG and IMG_0102.JPG. Also, the folder "102CAMERA" contains IMG_0201.JPG. When the digital camera 100, which manages the image data by such a folder and file structure, is connected to the PC 101, the operating system retrieves the driver software 202 for the digital camera when connection is detected and then loads it onto the DRAM.

Figure 4:
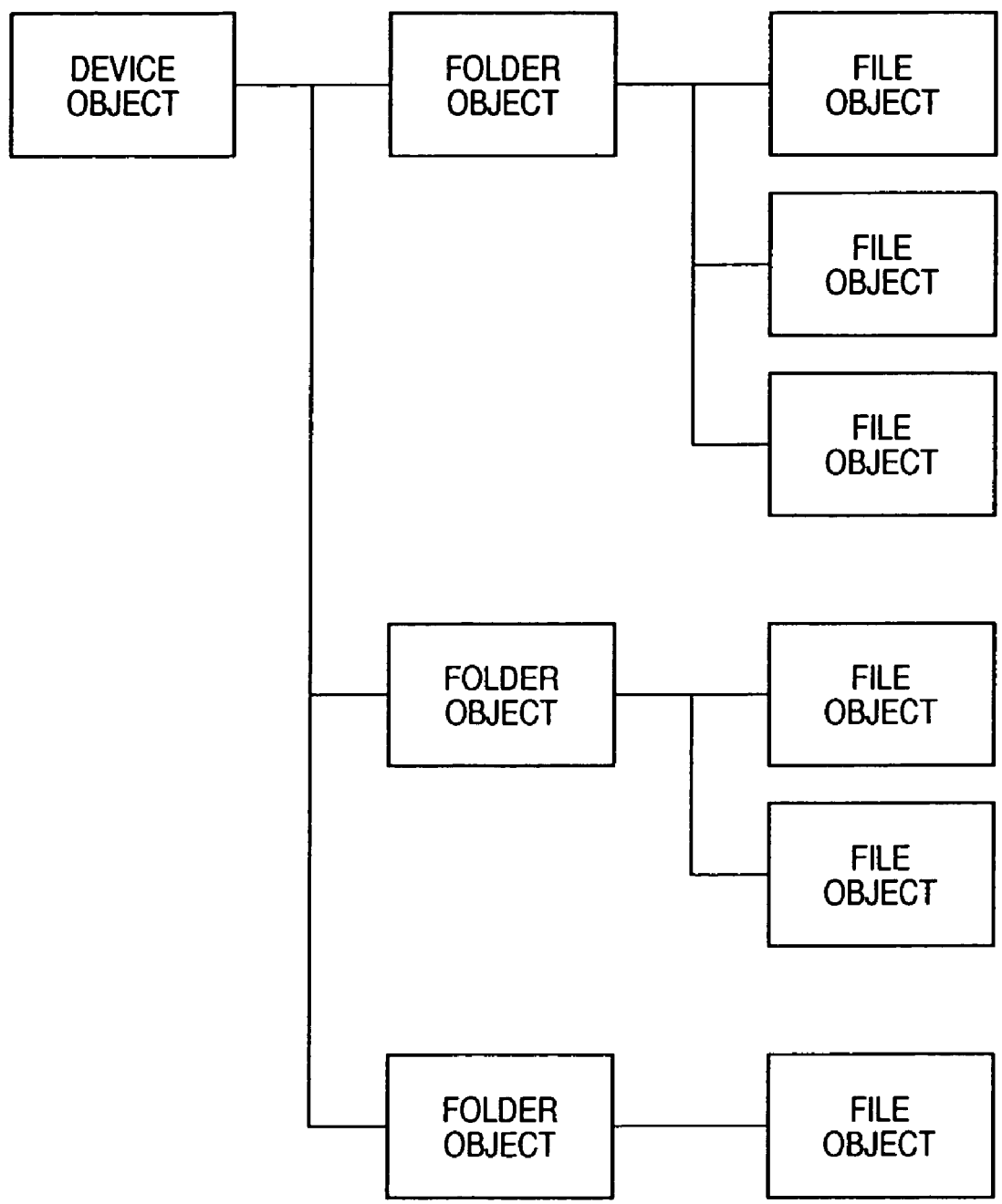
FIG. 4 shows an example of a structure of an object tree created by driver software in the information processing apparatus.

The loaded driver software 202 acquires image files and folder information from the digital camera 100, and then creates and manages an object tree shown in FIG. 4. The driver software 202 redefines folders and files in the camera 100 as objects, and holds instances of these objects with relation to each other in accordance with the folder and file structure in the digital camera 100. That is, when the camera 100 is connected to the PC 101, the driver software 202 creates the object tree in accordance with the structure of all folders and image files in the camera 100. Therefore in the case where a large number of image files are stored in the digital camera 100, users need to spend substantial amount of time when the camera 100 is connected to the PC 101 and have to wait without moving on to the next operation.

As a countermeasure against this matter, a method of managing objects, which is a characteristic of this embodiment, will be described below.

Figure 5:
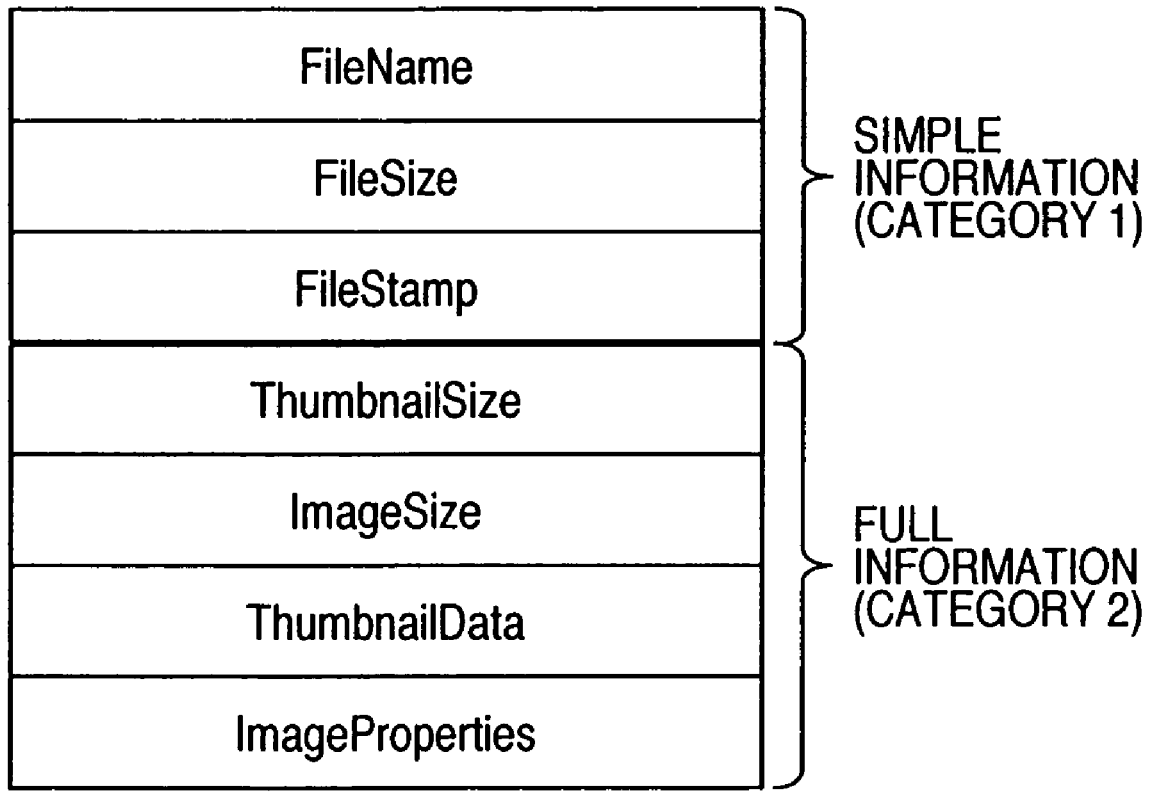
FIG. 5 shows an example of a structure of object attribute information according to the embodiment of the present invention.

First, information shown in FIG. 5 is used as attribute information of one object. The attribute information is roughly classified into two categories. Information acquirable from management information managed by a file system in the digital camera 100, in other words, information acquirable within relatively short periods of time, is classified as a category 1, which includes FileName representing each file name, FileSize representing the size of each file, and FileStamp representing date and time on which each file was created.

Classified as a category 2 is information unacquirable unless contents of each file are interpreted, in other words, information requiring some time to be acquired. In this embodiment, it takes longer time to acquire the information of the category 2 than that of the category 1. In an example shown in FIG. 5, ThumbnailSize representing data size of a thumbnail, ImageSize representing the number of vertical and horizontal pixels of an image, ThumbnailData representing actual thumbnail data, ImageProperties representing each image property, and the like are classified as the category 2. These attribute information are used when the driver software 202 running on the PC 101 manages the object tree, and also are stored on the DRAM in the digital camera 100 as a management table for the purpose of more quickly responding to the second and subsequent acquisition requests for the same information.

Figure 6:
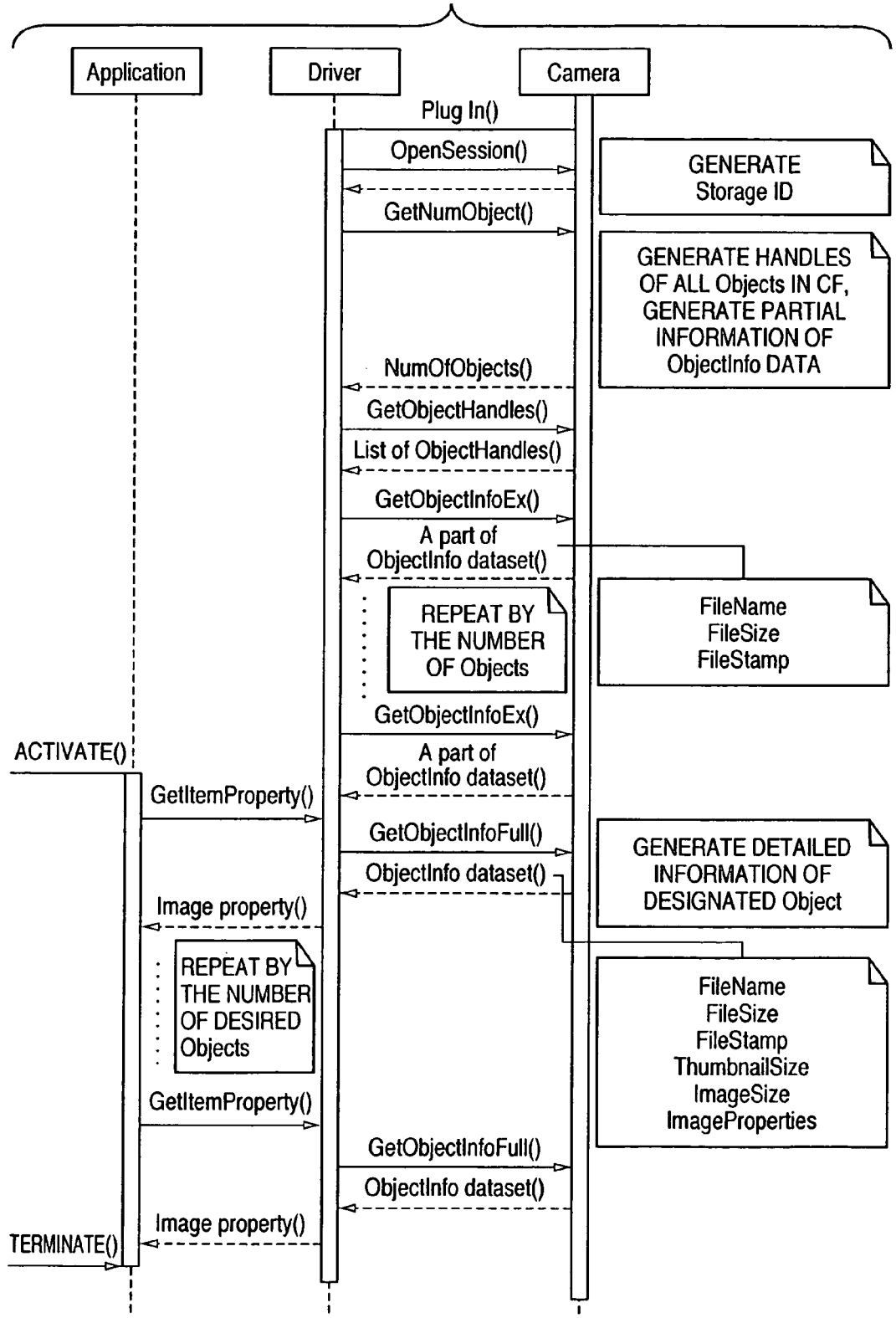
FIG. 6 is a sequence diagram showing a flow since the digital camera is connected to a PC until application software on the PC acquires information of a file according to the embodiment of the present invention.

FIG. 6 is a sequence diagram showing a flow since the digital camera 100 is connected to the PC 101 until the application software 201 on the PC 101 acquires information of a file.

When the digital camera 100 is connected to the PC 101 through the USB cable, the driver software 202 is loaded by the operating system. The activated driver software 202 first issues OpenSession operation to the camera 100 and initiates connection therewith. At this moment, the camera 100 generates a Storage ID (management ID of each recording medium such as a compact flash (CF)). In the generation process, initialization, for instance, of Storage ID is performed.

Next, the driver software 202 issues GetNumObject operation to acquire data of how many pieces of object data exist in the digital camera 100. At this moment, the digital camera 100 generates object attribute information corresponding to category 1 which is acquirable in relatively short periods of time, previously mentioned. The driver software 202 then issues GetObjectHandles operation to acquire handles of all folders and files in the camera 100.

Subsequently, the driver software 202 issues GetObjectInfoEx operation to acquire a part of the object attribute information (category 1) for every object from the camera 100. This operation is repeated to all object handles acquired previously. Operations up to here are performed at the time when the camera 100 is connected to the PC 101.

When the application software 201 is activated on the PC 101 by an end user and all object information of a desired object are to be acquired from the digital camera 100, the application software 201 issues GetItemProperty operation for the desired object to the driver software 202. In response to this request, the driver software 202 issues GetObjectInfoFull operation to the camera 100. Upon receipt of this operation, the camera 100 once reads a file header and the like of the object attribute information shown in FIG. 5 for only the objects designated by the application software 201, and generates object attribute information corresponding to category 2 which is unacquirable without analysis and thus requires some time for acquisition processing, and then stores the generated information in the aforementioned management table in the camera 100. The camera 100 also returns the generated object attribute information of category 2 to the PC 101. The application software 201 repeats the above operation for necessary objects.

Figure 7:
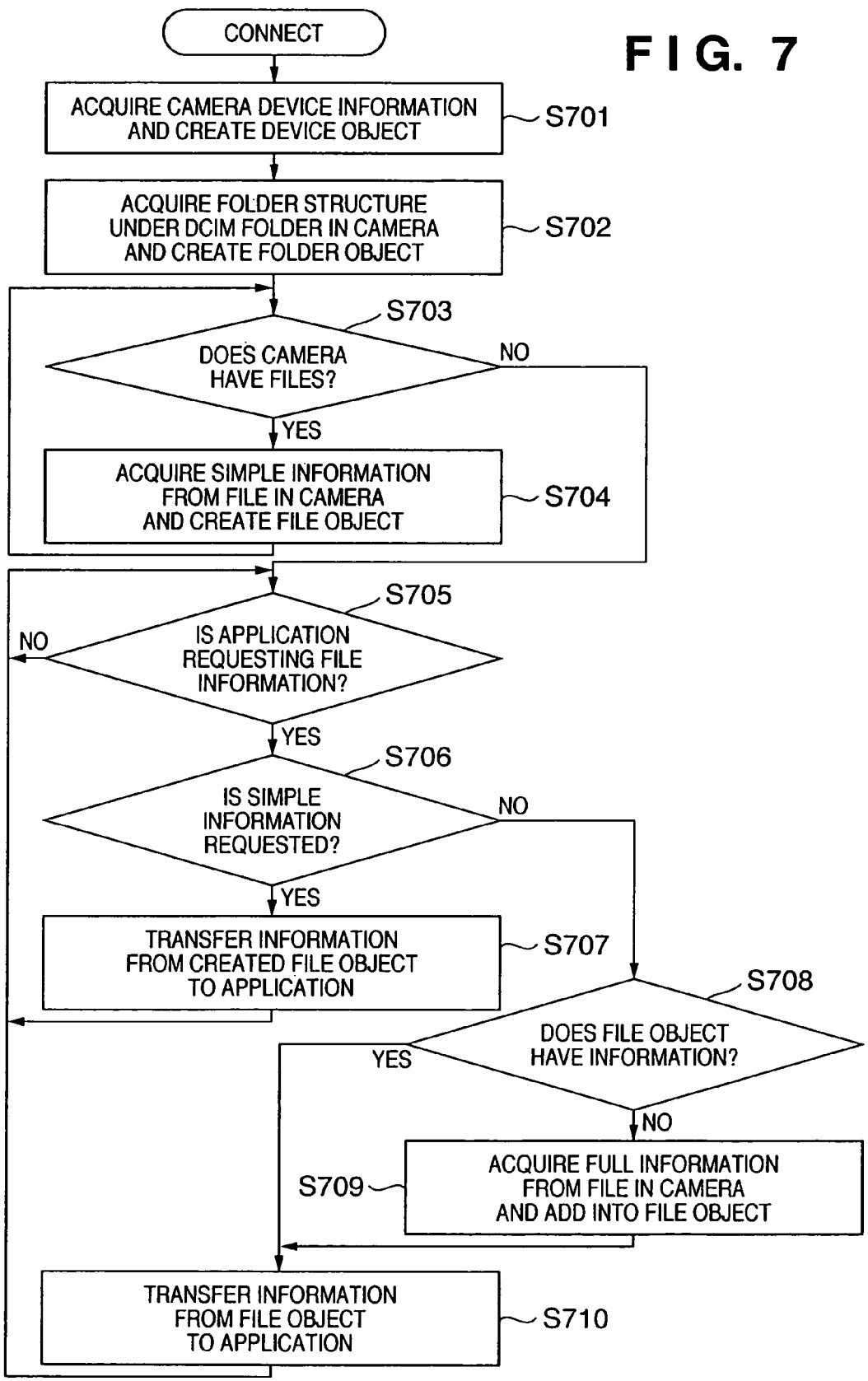
FIG. 7 is a flowchart showing an operation flow of the driver software in the information processing apparatus according to the embodiment of the present invention.

The following paragraph deals with operations of the driver software 202 referring to the flowchart in FIG. 7.

When the driver software 202 is activated by the operating system upon the connection between the digital camera 100 and the PC 101, the driver software 202 acquires a name of camera model, a vendor's name, and device information such as supported operations or types of event, in preparation for communication with the digital camera 100 (step S701).

The digital camera 100 is Design rule for Camera File system (DCF) compliant. The driver software 202 locates a DCIM folder in a recording medium provided in the digital camera 100, and retrieves DCF-compliant folders among subfolders of the DCIM folder to create an object tree using the retrieved folders as folder objects (step S702).

By the aforementioned GetNumObject operation, GetObjectHandles operation, and GetObjectInfoEx operation, the driver software 202 repetitively acquires a part of the object attribute information of every object in the camera 100, which is acquirable in relatively short periods of time and also corresponds to the above described category 1, and then sequentially stores the acquired partial attribute information in the previously created object tree (steps S703 and S704). When the acquisition processing is completed for all objects (No in step S703), the operations of the driver software performed at the time of connection between the camera 100 and the PC 101 are finished.

After that, the driver software 202 determines the presence or absence of a request from the application software 201 (step S705), and when the request from the application software 201 arises and the object attribute information of category 1 stored in the object tree created by the driver software 202 is sufficient enough to cope with the request (YES in step S706), the driver software 202 responds to the application software 201 without accessing the digital camera 100 (step S707).

When the object attribute information of category 1 is not sufficient enough to cope with the request from the application software 201 (NO in step S706), it is necessary to acquire object attribute information of category 2. However, if there is a history that the a target object has been acquired before from the camera 100, the target object attribute information has already been stored in the object tree managed by the driver software 202. Accordingly, the driver software 202 ascertains whether it has been stored or not (step S708), and when the target object attribute information has been already stored in the object tree (YES in step S708), the driver software 202 responds to the application software 201 in accordance with the stored information, without accessing the digital camera 100 (step S710). When the target object attribute information has not been stored (NO in step S708), the driver software 202 requests from the camera 100 the object attribute information of category 2 which requires some time for acquisition processing, and stores the acquired object attribute information in the object tree (step S709).

As described above, in a protocol handling files and the like in the camera as objects, such as a PTP, this embodiment achieves decentralization of time-consuming operations in the camera as much as possible and provides an operational environment relatively convenient for users even when large amount of data resides in the camera.

The above embodiment has dealt with the case where the present invention is applied to the digital camera. The present invention is, however, not limited thereto and is also applicable to a digital video camera and portable type terminal devices having a camera module, such as a portable telephone, and a personal digital assistant (PDA). The present invention is also applicable to a network camera system in which a drive in a camera control terminal executes the processes in FIG. 6 and FIG. 7 in response to connection with the network camera via the network.

Furthermore, the attribute information is classified as shown in FIG. 5 in the above embodiment. The present invention is, however, by no means limited thereto, and classification may depend on a file system management method of a connected digital camera. For example, when a file system of the connected digital camera manages up to attribute Imagesize, the driver software may classify Imagesize as the category 1.

Moreover, in the above embodiment, physical connection between the PC and digital camera leads to activation of the driver software and thereafter processing in FIG. 7 is automatically started. However, start timing of this processing in FIG. 7 is not limited thereto. For example, it is also allowable that, after activation of the application software, the driver software is activated and also connection with the digital camera is established in response to user's input operation onto an operation screen for directing connection with the digital camera, and afterwards the processing in FIG. 7 is started.

Other Embodiments

The present invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus capable of communicating with an information input apparatus, comprising:
   reception unit configured:
   (1) in a first reception operation where the information processing apparatus is connected to the information input apparatus, to receive information specifying a file recorded on a recording medium of the information input apparatus;
   (2) in a second reception operation after the reception in the first reception operation, to receive part of attribute information, not all of the attribute information, of the file recorded on the recording medium of the information input apparatus; and
   (3) in a third reception operation after the reception in the second reception operation, to receive information which has not been received in the second reception operation, not all of the file, among information included in the file recorded on the recording medium of the information input apparatus,
   wherein the part of attribute information received in the second reception operation is obtainable without analyzing the file, and the information received in the third reception operation is obtainable by analyzing the file.

2. The information processing apparatus according to claim 1, wherein in the first reception operation said reception unit further receives information specifying the folder recorded on the recording medium of the information input unit.

3. The information processing apparatus according to claim 1, wherein in the first reception operation said reception unit receives information specifying all files recorded on the recording medium of the information input unit.

4. The information processing apparatus according to claim 1, wherein in said second reception operation said reception unit receives part of the attribute information of a file corresponding to the information specifying the file received in the first case.

5. The information processing apparatus according to claim 1, wherein the part of the attribute information to be received in the second reception operation by said reception unit requires less time to receive than the rest of the attribute information not to be received in the second reception operation by said reception unit.

6. The information processing apparatus according to claim 1, wherein the part of the attribute information to be received in the second reception operation by said reception unit is information managed by a file system of the information input apparatus.

7. The information processing apparatus according to claim 1 further comprising:
   a first request unit that requests the part of the attribute information to be received in the second reception operation by said reception unit to the information input apparatus; and
   a second request unit that requests the information to be received in the third reception operation by said reception unit to the information input apparatus.

8. The information processing apparatus according to claim 7, wherein the information received in the third reception operation by said reception unit is generated in response to the request by said second request unit.

9. The information processing apparatus according to claim 1, wherein the part of the attribute information to be received in the second reception operation by said reception unit includes at least one of a file name, file size, and generation date and time of a file.

10. The information processing apparatus according to claim 1, wherein the information to be received in the third reception operation by said reception unit includes at least one of thumbnail data and size of data included in the file, and size of the thumbnail data.

11. The information processing apparatus according to claim 1, wherein the information input apparatus is a digital camera.

12. An information input apparatus capable of communicating with an information processing apparatus, comprising:
   a transmission unit configured:
   (1) in a first transmission operation where the information input apparatus is connected to the information processing apparatus, to transmit information specifying a file recorded on a recording medium of the information input apparatus;
   (2) in a second transmission operation after the transmission by said transmission unit in the first transmission operation, to transmit part of attribute information, not all of the attribute information, of the file recorded on the recoding medium of the information input apparatus; and
   (3) in a third transmission operation after the transmission by said transmission unit in the second transmission operation, to transmit information which has not been transmitted by said transmission unit in the second transmission operation, not all of the file, among information included in the file recorded on the recording medium of the information input apparatus,
   wherein the part of attribute information transmitted in the second transmission operation is obtainable without analyzing the file, and the information transmitted in the third transmission operation is obtainable by analyzing the file.

13. The information input apparatus according to claim 12, wherein in the first transmission operation said transmission unit further transmits information specifying the folder recorded on the recording medium of the information input unit.

14. The information input apparatus according to claim 12, wherein in the first transmission operation said transmission unit transmits information specifying all files recorded on the recording medium of the information input unit.

15. The information input apparatus according to claim 12, wherein in the second transmission operation said transmission unit transmits part of the attribute information of a file corresponding to the information specifying the file transmitted in the first transmission operation by said transmission unit.

16. The information input apparatus according to claim 12, wherein the part of the attribute information to be transmitted in the second transmission operation by said transmission unit requires less time to transmit than the rest of the attribute information not to be transmitted in the second transmission operation by said transmission unit.

17. The information input apparatus according to claim 12, wherein the part of the attribute information to be transmitted in the second transmission operation by said transmission unit is information managed by a file system of the information input apparatus.

18. The information input apparatus according to claim 12 further comprising:
   a first request reception unit that receives a first request from the information processing apparatus that requests the part of the attribute information to be transmitted in the second transmission operation by said transmission unit; and
   a second request reception unit that receives a second request from the information processing apparatus that requests the information to be transmitted in the third transmission operation by said transmission unit.

19. The information input apparatus according to claim 18 further comprising a generation unit that generates the information to be transmitted in the third transmission operation by said transmission unit in response to the reception of the second request.

20. The information input apparatus according to claim 12, wherein the part of the attribute information to be transmitted in the second transmission operation by said transmission unit includes at least one of a file name, file size, and generation date and time of a file.

21. The information input apparatus according to claim 12, wherein the information to be transmitted in the third transmission operation by said transmission unit includes at least one of thumbnail data and size of data included in the file, and size of the thumbnail data.

22. The information input apparatus according to claim 12, wherein the information input apparatus is a digital camera.

23. An information processing method for an information processing apparatus capable of communicating with an information input apparatus, comprising:
   a first reception step of, in a case where the information processing apparatus is connected to the information input apparatus, receiving information specifying a file recorded on a recording medium of the information input apparatus;
   a second reception step of, after the reception in said first reception step, receiving part of attribute information, not all of the attribute information, of the file recorded on the recoding medium of the information input apparatus; and a third reception step of, after the reception in said second reception step, receiving information which has not been received in said second reception step, not all of the file, among information included in the file recorded on the recording medium of the information input apparatus, wherein the part of attribute information received in the second reception step is obtainable without analyzing the file, and the information received in the third reception step is obtainable by analyzing the file.

24. A computer readable medium storing a computer program for implementing the information processing method described in claim 23.

25. An information transmission method for an information input apparatus capable of communicating with an information processing apparatus, comprising:

a first transmission step of, in a case where the information input apparatus is connected to the information processing apparatus, transmitting information specifying a file recorded on a recording medium of the information input apparatus;

a second transmission step of, after the transmission in said first transmission step, transmitting part of attribute information, not all of the attribute information, of the file recorded on the recoding medium of the information input apparatus; and a third transmission step of, after the transmission in said second transmission step, transmitting information which has not been transmitted in said second transmission step, not all of the file, among information included in the file recorded on the recording medium of the information input apparatus, wherein the part of attribute information transmitted in the second transmission step is obtainable without analyzing the file, and the information transmitted in the third transmission step is obtainable by analyzing the file.

26. A computer readable medium storing a computer program for implementing the information transmission method described in claim 25.

* * * * *